Nov. 10, 1925. Re. 16,203
L. B. GOLDBERG ET AL
GASOLINE CAMP STOVE
Original Filed Oct. 21, 1921 2 Sheets-Sheet 1
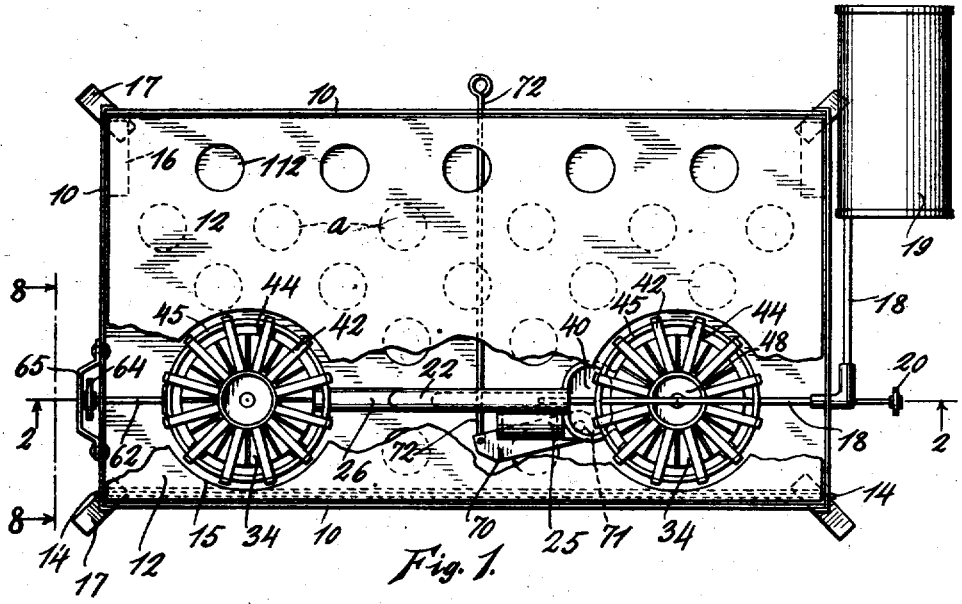
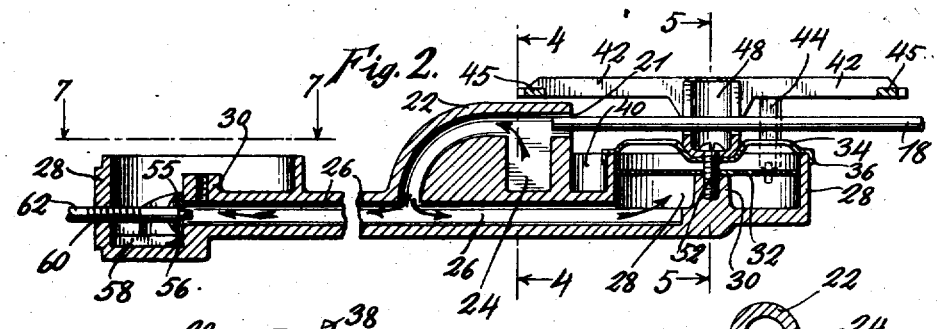
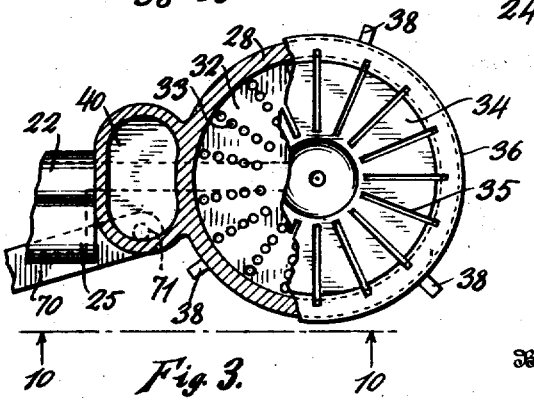
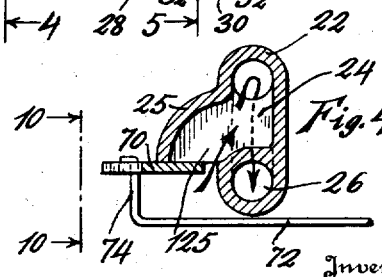
Inventors
Louis B. Goldberg,
Nathan Goldberg,
Jacob M. Goldberg,
William Goldberg.
By A. J. O'Brien Attorney Nov. 10, 1925. Re. 16,203

L. B. GOLDBERG ET AL.

GASOLINE CAMP STOVE

Original Filed Oct. 21, 1921 2 Sheets-Sheet 2

Inventors
Louis B. Goldberg,
Nathan Goldberg,
Jacob M. Goldberg,
William Goldberg.

By A. J. O'Brien Attorney

Reissued Nov. 10, 1925.

Re. 16,203

UNITED STATES PATENT OFFICE.

LOUIS B. GOLDBERG, NATHAN GOLDBERG, JACOB M. GOLDBERG, AND WILLIAM GOLDBERG, OF DENVER, COLORADO.

GASOLINE CAMP STOVE.

Original No. 1,517,355, dated December 2, 1924, Serial No. 509,396, filed October 21, 1921. Application for reissue filed August 7, 1925. Serial No. 48,908.

*To all whom it may concern:*

Be it known that we, LOUIS B. GOLDBERG, NATHAN GOLDBERG, JACOB M. GOLDBERG, and WILLIAM GOLDBERG, citizens of the United States, residing at the city and county of Denver, State of Colorado, have invented certain new and useful Improvements in Gasoline Camp Stoves, of which the following is a full, clear, and exact description, such as will enable others skilled in the art to make and use the same, reference being had to the accompanying drawings, which form a part hereof.

The object of the invention is to provide a durable and efficient portable camp stove, which shall be comparatively simple and cheap to manufacture.

This application is an improvement over our application, Serial No. 503,352, filed September 26, 1921.

The stove comprises a casing wherein the burners are mounted, the burners being supplied with liquid fuel from a small pressure tank. More particularly, the invention resides in the burner and manifold construction. Air is received in regulated quantities into the manifold through a downwardly directed port which prevents material interference with the fuel mixture by a strong breeze or lateral draft. The burners include a spreader plate and spaced thereabove a guard plate which prevents the flame from being easily blown out. These plates rest upon the walls of the body or cup of the burner, and the said walls are provided with lugs which directly support the grates of the burners. A vaporizing cup is provided adjacent the manifold so as to heat a tube leading from the pressure tank, and each grate is also provided with a vaporizing cup. Preferably the primary burner underlies said tube so as to heat the same during operation. In the secondary or remote burner a cylindrical bore is provided whose axis is perpendicular to the bottom of the burner, and a curved plate having a guide tongue movable in a guide slot is adjustable toward and from said axis and a wall of said bore to control the supply of fuel to the respective burner.

In the drawings wherein one embodiment of the invention is disclosed,

Fig. 1 is a plan view of the stove with the cover 80 removed;

Fig. 2 is a longitudinal section through the burners and manifold taken on line 2—2 of Fig. 1;

Fig. 3 is a view of the primary burner construction with the grate removed and with parts broken away;

Fig. 4 is a sectional detail on line 4—4 of Fig. 2;

Figure 9:
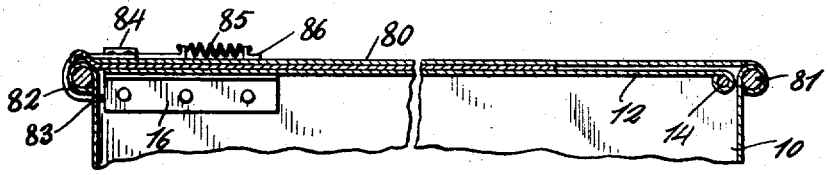
Fig. 9 is a cross section showing a latch for retaining a cover.
Figure 10:
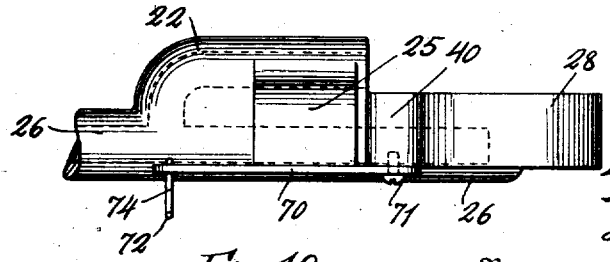
Fig. 10 is an elevational detail taken from line 10—10 of Fig. 4.

A casing 10 houses the burners and is provided with a work plate or table 12 having a row of ventilating and cooling apertures 112 spaced from the burners, said plate being hinged to the casing at 14 and being cut out to receive the burner grates at 15. Supporting brackets 16 (Figs. 1 and 9) are mounted on the casing for engagement by the forward end of plate 12. A fuel pipe 18 leading from a small pressure tank 19 and controlled by a valve 20, leads across the primary burner to and into an opening 21 in a manifold 22 between the burners. Manifold 22 has therewithin a mixing chamber 24 receiving air through a downwardly directed inlet port 125 formed by a laterally offset lip 25 on the side of the manifold. The manifold communicates with a fuel duct 26 leading to the burner cup 28 of each burner. Each burner 28 has a central threaded hub 30 extending upward from the bottom thereof and this hub supports a spreader plate 32 having a series of radiating rows of apertures 33. A guard plate 34 rests upon the walls of the cup, this plate being provided with a series of radiating slots 35 staggered vertically with relation to the aperture-rows 33, and having a depending positioning flange 36 engaging the outer walls of the cup.

Figure 5:
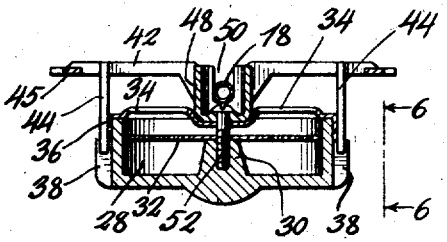
Fig. 5 is a section taken on line 5—5 of Fig. 2.
Figure 6:
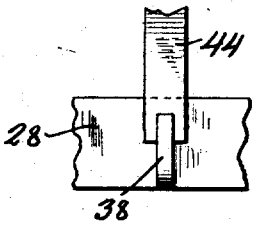
Fig. 6 is an elevational detail taken from line 6—6 of Fig. 5.

The outer walls of each cup 28 are provided with lugs 38, and a vaporizing cup 40 is placed between the primary burner and the manifold 22 for the purpose of receiving a quantity of fuel to heat up the tube 18 and adjacent parts when starting the burner. A grate 42 is supported above each burner by means of integral legs 44 resting upon the lugs 38, the grate being formed of radiating bars and an annular member 45. The middle of each grate is in the form of a priming or vaporizing cup 48 to receive liquid fuel initially for speeding up the starting operation, and this cup 48 is slotted for a part of the way to its bottom as indicated at 50 to receive the tube 18. The bottom of cup 48 rests in a depression in the guard plate 34 and a screw 52 (Fig. 5) passes through the said bottom and the plates 32 and 34 and is threaded into the hub 30, the screw thus retaining the parts in operative relation. If desired one of the legs 44 may rest on the edge of cup 40 and one of the lugs 38 on the primary burner be eliminated.

Figure 7:
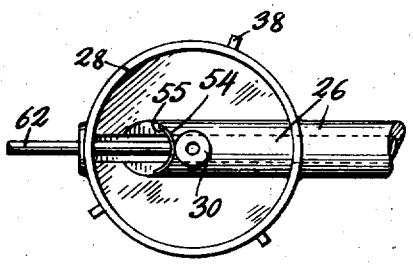
Fig. 7 is a plan of the secondary burner parts taken from line 7—7 of Fig. 2.
Figure 8:
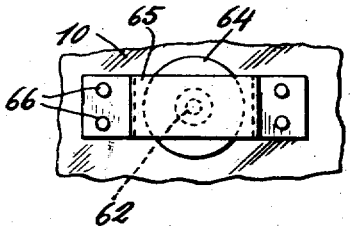
Fig. 8 is an elevational detail taken from line 8—8 of Fig. 1.

In the case of the secondary or remote burner, the vapor duct 26 leads to a point on the outer side thereof which is beyond the respective hub 30, so that the flow of fuel may be controlled by a valve operable from the outside of the casing 10. Said valve is in the form of a curved plate 55 which engages and fits against a portion of the cylindrical surface of a cylindrical bore as indicated at 54 (Fig. 7), the axis of this bore being perpendicular to the bottom of the burner. A tongue 56 on the lower edge of the plate 55 runs in a guide groove 58 in the bottom of the burner and thus maintains the position of the plate. An operating stem 62, which is threaded in the wall of the burner at 60, has its inner end connected with plate 55 for reciprocation of the latter, while its outer end extends through casing 10 and is provided with an operating disc 64, said disc being guarded by relatively narrow strap 65 secured to the casing as at 66.

In order to control the flow of air to the mixing chamber 24, a damper or valve 70 is provided to cover the opening 125 under lip 25. In the form shown, this valve swings on a pivot 71 threaded into the end of vaporizing cup 40, and a manipulating rod 72, having an upturned end 74 directly engaging the valve, leads forward to the front of the casing 10 where its end is accessible. This valve is particularly valuable in case of a strong breeze, or when the pressure in the tank 19 is high and it is desired to turn the flame low; in this instance, the valve is partially or entirely closed to reduce the flow of air, and popping out of the flame is avoided. The flow of fuel to the secondary burner is also controllable independently of the other burner by valve plate 55, and the construction shown affords a simple and cheap means for such control. The two plates 32 and 34 afford an excellent control for the fuel gas at the point of combustion, and this is particularly assisted by the staggered relation of rows of apertures 33 and slots 35. Plate 32 spreads the mixture and plate 34 prevents material disturbance thereof in the space between the plates when a breeze is blowing, thus effectually preventing blowing out of the flame by a moderate breeze. The hub of the grate further protects the flame on the leeward side.

Burning liquid fuel in the vaporizing cup 40 not only heats up the tube 18 to vaporizing point but also heats up the manifold 22. Further heating of tube 18 may be had if necessary by burning liquid fuel in cup 48 of the primary burner gate. The downwardly directed opening of the intake 125 avoids interference with the current of air by a breeze, because the breeze moves laterally and the natural draft is upward.

The plate 12 serves as a support for vessels which are not desired to be directly over the flame. The space under said plate and forward of the burners is utilized for carrying the tank 19 when not in use. A cover 80 which may be hinged to the back of the casing 10 at 81 is provided with the secure latch 82 shown in Fig. 9. The tip of this latch, which is hook shaped, enters an aperture in the casing wall at 83, while the body thereof which lies on top of the cover 80 is guided by a loop or the like 84 secured to the cover. A spring 85 is secured to the rear end of the latch 82 and is fixed to a lug 86 on the cover. In this manner spring 85 always retains the latch in engagement with aperture 83 in the casing, thus preventing accidental opening of the cover. At the same time the latch may be readily released by withdrawing the same against the tension of the spring. As seen in Fig. 1, legs 17 may be provided for support of the stove if the same are desired, and inasmuch as the draft to the burners is had chiefly through apertures *a* in the bottom of the casing use of said legs would be preferable.

We claim:

1. In a cam stove, a burner having upwardly extending walls, lugs on said walls, a burner plate carried on said walls, a grate above the burner having supports carried on said lugs, and a screw securing both the plate and the grate to the burner.

2. In a camp stove, a burner having upwardly extending walls, said burner opening upward, a spreader plate on the burner, a grate above the burner having supports carried by said walls, and a screw securing the plate and the grate to the burner.

3. In a camp stove, a burner having upwardly extending walls, said burner opening upwardly, a spreader plate on the burner, a grate above the burner and mounted on said walls, a vaporizing cup on said grate, and a fuel conduit leading across said cup to supply the burner.

4. In a camp stove, a manifold, an upwardly opening burner connected therewith, a vaporizing cup between the manifold and the burner, a guard plate on the burner said guard plate having a central depression adapted to serve as a fuel cup, and a fuel conduit leading across said cups to said manifold.

5. In a camp stove, a manifold, an upwardly opening burner connected with the manifold, a vaporizing cup between the manifold and the burner, a grate positioned above the burner and having a vaporizing cup, and a fuel conduit leading across said cups to said manifold.

6. In a camp stove, a burner, a manifold conduit leading thereto, the burner being provided with a cylindrical bore perpendicular to said conduit to provide a partially cylindrical face, and a partially cylindrical adjustable closure to engage said face and close said conduit.

7. In a camp stove, a burner, a manifold conduit leading thereto, a closure face being provided at the end of the conduit, an adjustable closure to engage said face, means to adjust said closure, said burner being provided with a guide groove, and a tongue on said closure and entering said groove for guiding the closure.

8. In a camp stove, a burner, a manifold conduit leading thereto, the burner being provided with a cylindrical bore perpendicular to said conduit to provide a partially cylindrical face, a partially cylindrical adjustable closure to engage said face for closing the conduit, a guiding tongue on said closure, said burner having a groove receiving said tongue to guide the closure, and means to adjust the position of the closure.

9. In a camp stove, a burner having upwardly extending walls and opening upward, a substantially flat spreader plate mounted in said burner providing a single gas-receiving chamber therebeneath and having a plurality of radiating rows of apertures, and a guard plate spaced from the spreader plate and mounted on the burner and having a corresponding number of radiating slots.

In testimony whereof, we affix our signatures.

LOUIS B. GOLDBERG.
NATHAN GOLDBERG.
JACOB M. GOLDBERG.
WILLIAM GOLDBERG.